Oct. 27, 1959        A. T. BERMINGHAM, JR., ET AL        2,910,222
RETURN ENVELOPE CONSTRUCTION
Filed March 18, 1957                                     11 Sheets-Sheet 2

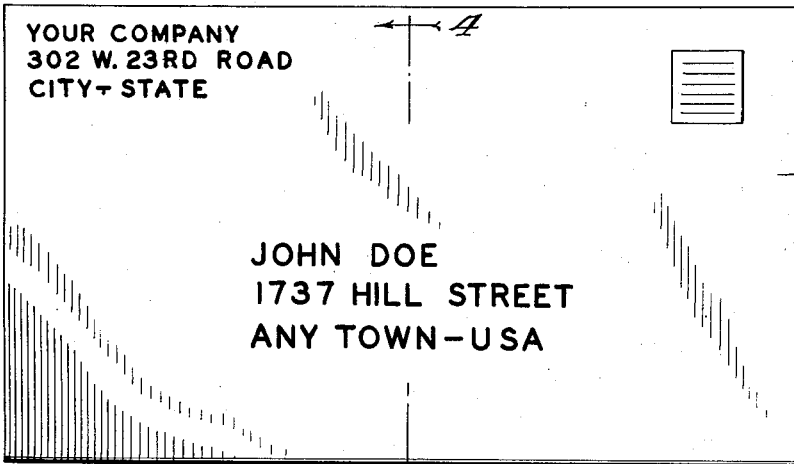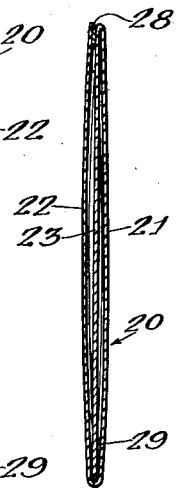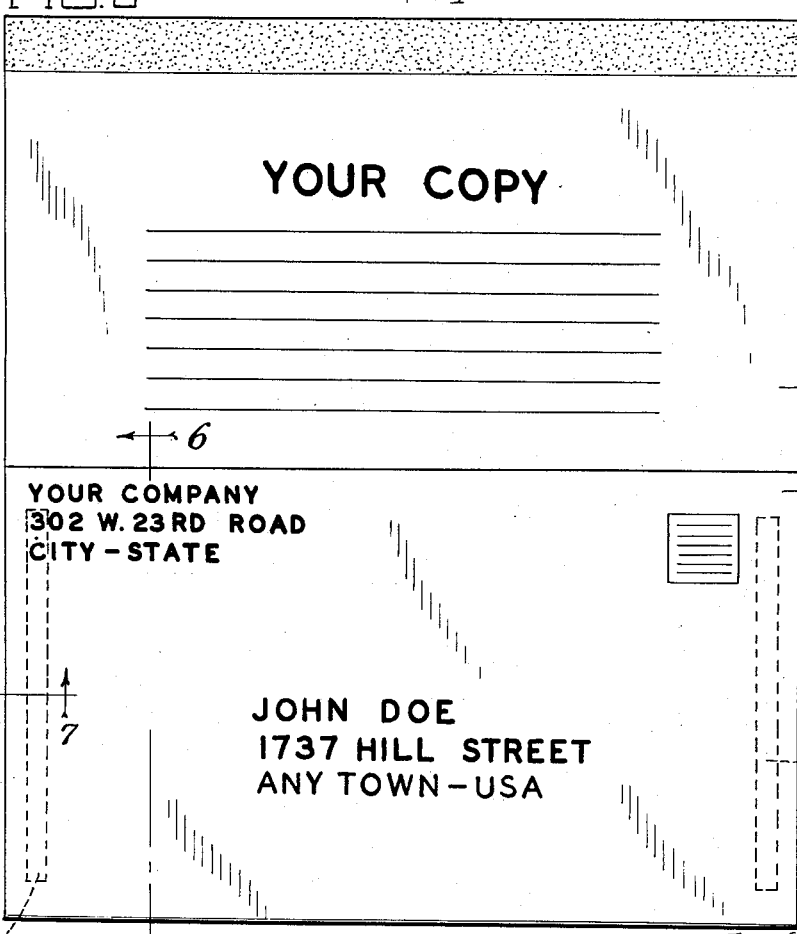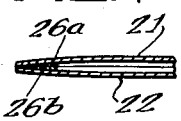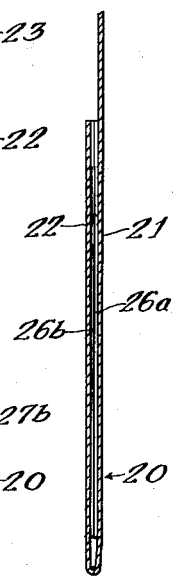

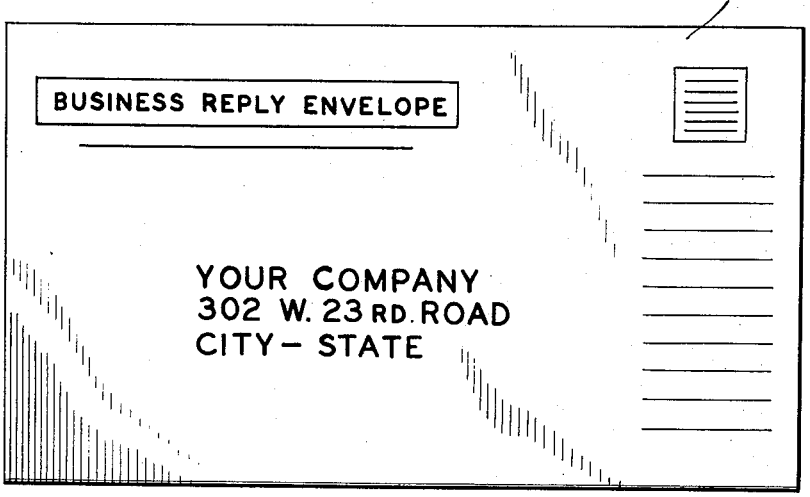

Oct. 27, 1959   A. T. BERMINGHAM, JR., ET AL   2,910,222
RETURN ENVELOPE CONSTRUCTION
Filed March 18, 1957                          11 Sheets-Sheet 6

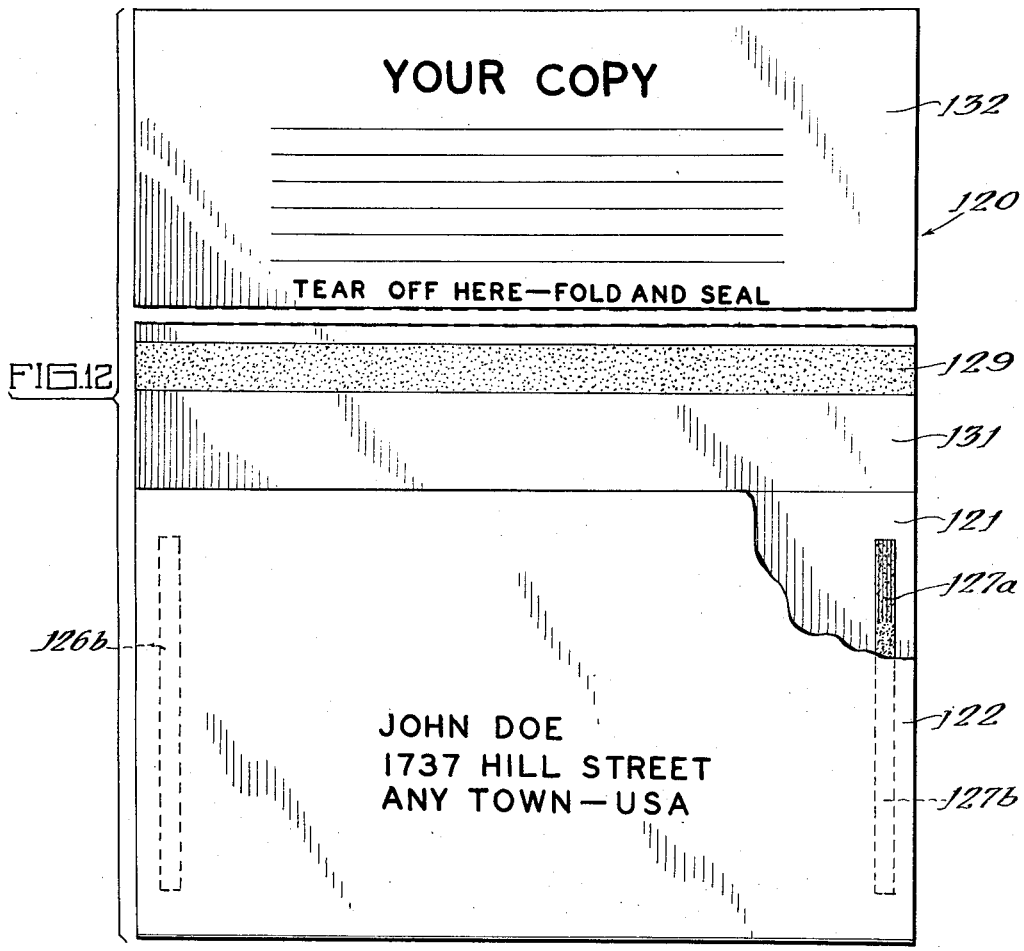
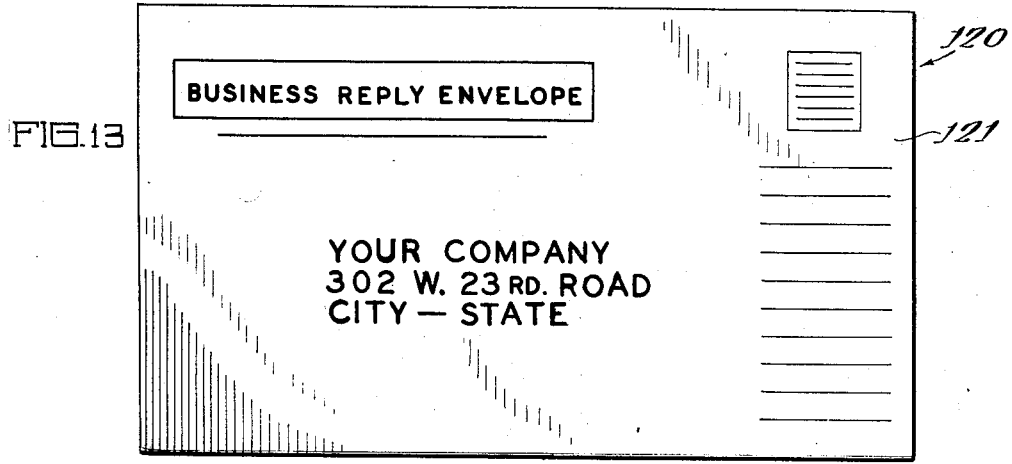

Oct. 27, 1959     A. T. BERMINGHAM, JR., ET AL     2,910,222
RETURN ENVELOPE CONSTRUCTION
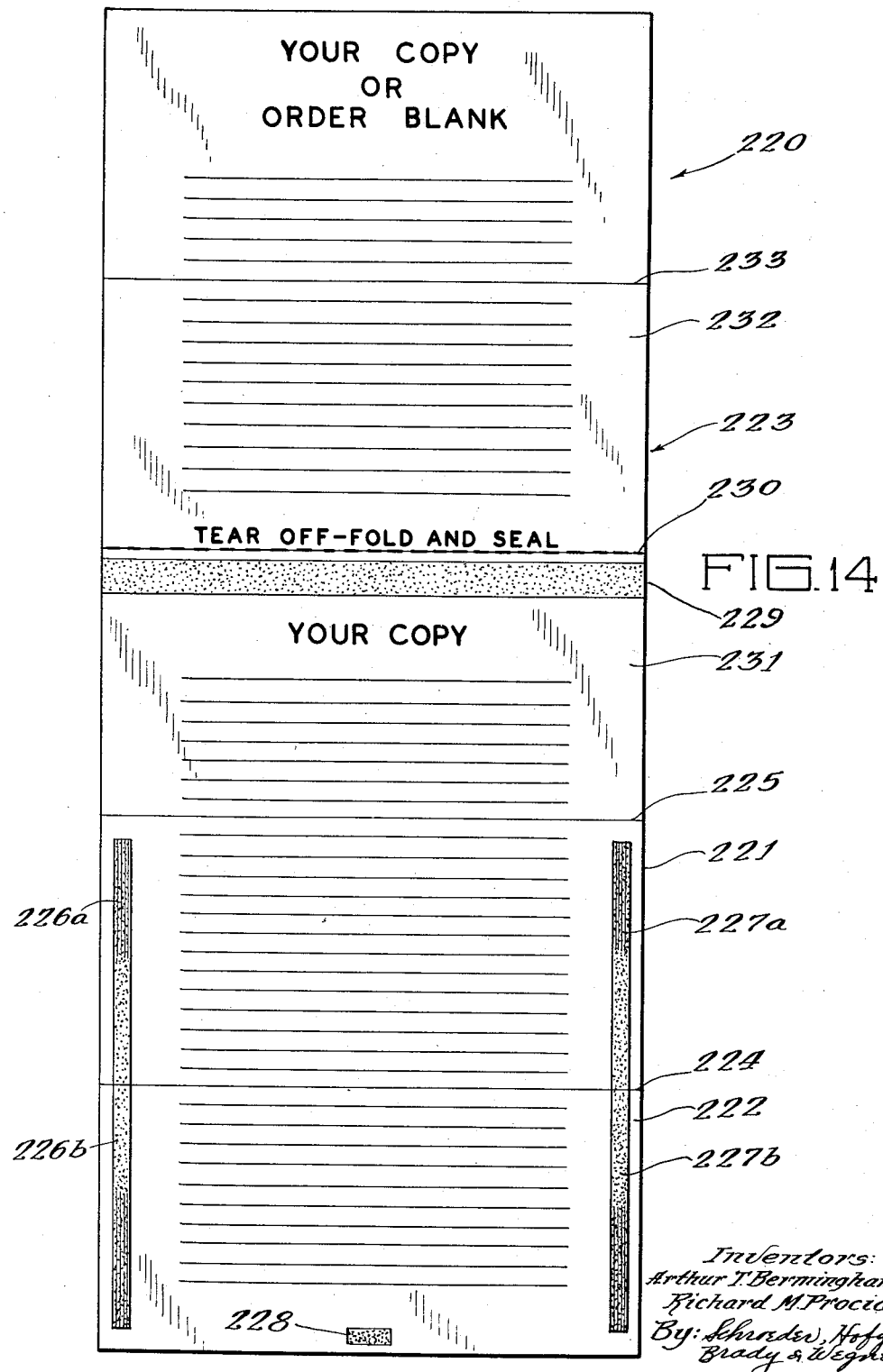

Oct. 27, 1959    A. T. BERMINGHAM, JR., ET AL    2,910,222
RETURN ENVELOPE CONSTRUCTION
Filed March 18, 1957    11 Sheets-Sheet 10
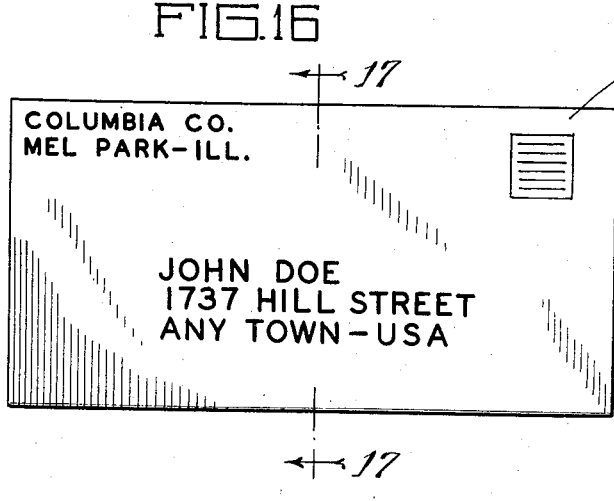
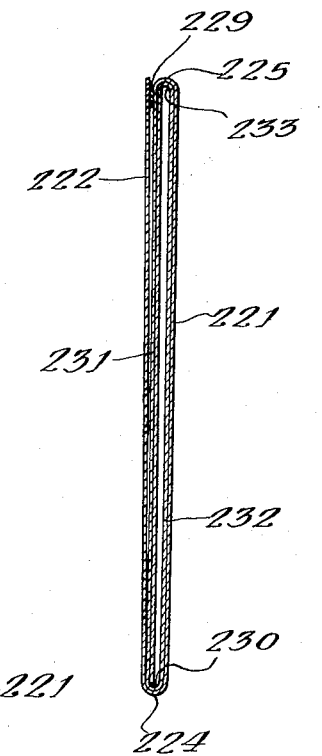
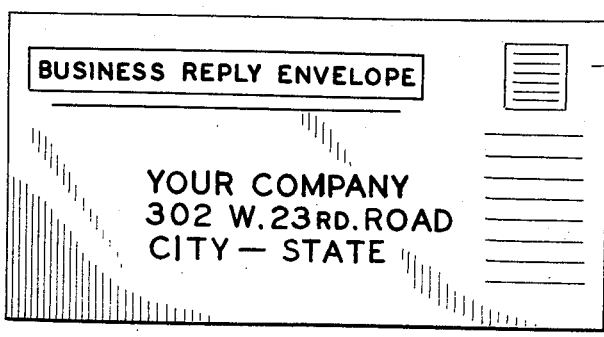
Inventors:
Arthur T. Bermingham, Jr.
Richard M. Procido
By: Schroeder, Hofgren,
Brady & Wegner
Attorneys

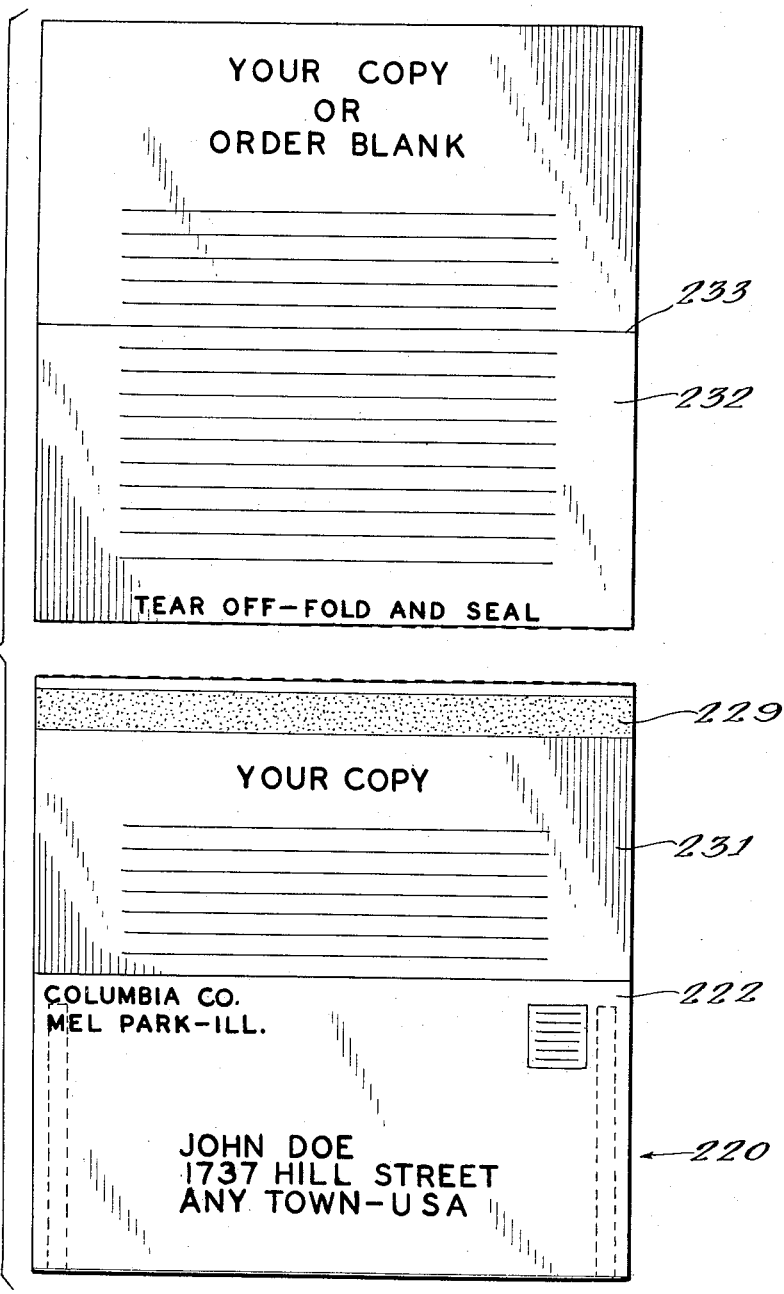

United States Patent Office 2,910,222
Patented Oct. 27, 1959

2,910,222

RETURN ENVELOPE CONSTRUCTION

Arthur T. Bermingham, Jr., River Forest, and Richard M. Procido, Roselle, Ill., assignors to Columbia Envelope Company, a corporation of Illinois Application March 18, 1957, Serial No. 646,670

1 Claim. (Cl. 229—73)

This invention relates to a return envelope construction, and in particular it relates to such a construction which may be mailed originally in the form of a multiple folded single sheet, and which may be quickly formed into an envelope before it is returned to the original sender.

The principal object of the present invention is to provide a very simple return envelope construction.

Another object of the invention is to provide a return envelope construction which is adapted to be mailed originally in the form of a multiple folded sheet, but which may be readily converted into a sealed return envelope by the recipient.

Yet another object of the invention is to provide a basic return envelope structure which may be modified in various respects to provide mailing pieces of various characteristics.

The structure of the present invention utilizes the type of cohesive but inadhesive material commonly found in so-called "self-sealing" envelopes, which is a latex material well known in the envelope art under the term "dry sealing adhesive." The principal characteristic of the material is that two strips of it when brought into juxtaposition will stick to one another with great tenacity, but neither will stick to any other object. Accordingly, if a piece of paper is inserted between two strips of such material, the interfolded sheet may be handled like an ordinary folded sheet of paper.

In its simplest form, the present invention consists of an elongated sheet of paper which is divided by a pair of transverse hinge lines into three panels. The center panel and one of the panels flanking it are envelope panels, while the additional panel provides a protective panel. The side margins of the two envelope panels on their inner faces are provided with matching strips of cohesive but inadhesive material, so that if the two envelope panels are folded with their inner faces abutting the matching strips may engage with one another to form the envelope panels into an envelope, and in this case the protective panel acts as an envelope flap. On the other hand, if the protective panel is folded between the two envelope panels, it segregates the matching cohesive strips from one another, and the thus folded sheet may be inserted in an envelope for mailing, or may be placed in suitable condition for mailing by fastening its loose end with a staple or a small bit of adhesive material.

Three embodiments of the invention are illustrated in the accompanying drawings in which:

Fig. 3 is a front view of the device prepared for original mailing;

Fig. 4 is a section taken as indicated along the line 4—4 of Fig. 3;

Fig. 5 is a plan view of the device made up into an envelope for return mailing, showing the inner face of the protective flap;

Fig. 6 is a fragmentary section taken as indicated along the line 6—6 of Fig. 5;

Fig. 7 is a fragmentary section taken as indicated along the line 7—7 of Fig. 5;

Fig. 8 is a front elevational view of the device completely folded and sealed for return mailing;

Fig. 11 is a view of the second form of the device folded for original mailing and enclosed in a window envelope which is shown in broken lines;

Fig. 12 is a plan view of the second form of the device prepared for return mailing, with a portion of the protective flap detached to serve as an order blank or the like, one corner of the envelope panel being broken away to show the location of the strip of cohesive material;

Fig. 13 is a front view of the finished device folded and sealed for return mailing;

Fig. 14 is a plan view of the inner face of a third form of the device;

Fig. 16 is a view of the device of Fig. 14 folded for initial mailing;

Fig. 17 is a section on an enlarged scale taken as indicated along the line 17—17 of Fig. 16;

Fig. 18 is a plan view of the device of Fig. 14 folded for return mailing, showing the inner face of the envelope flap portion of the protective panel, with the detachable order blank removed therefrom; and Fig. 19 is a view of the device of Fig. 14 fully folded and sealed for return mailing.

Figure 1:
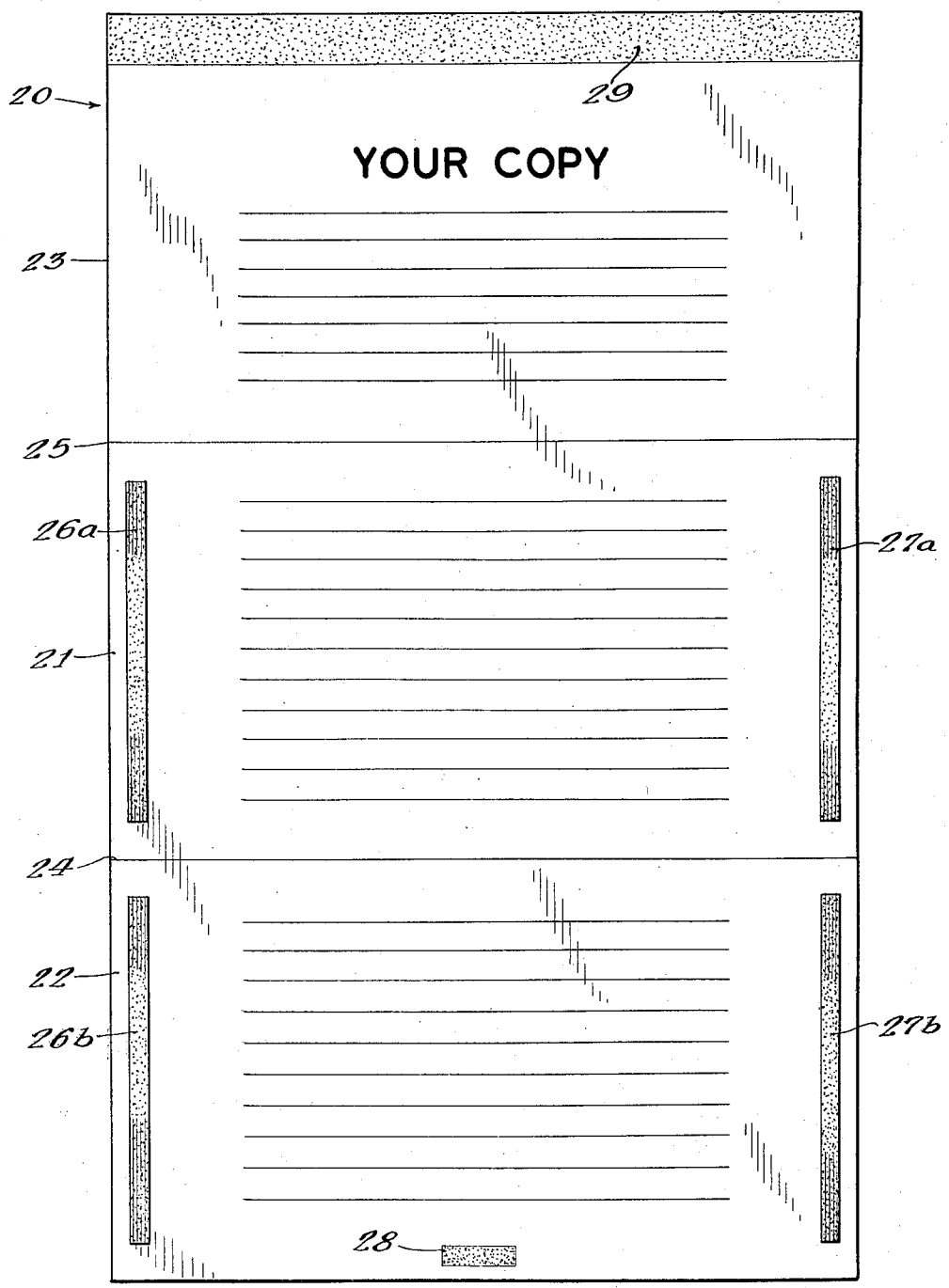
Fig. 1 is a plan view of the inner face of a sheet constructed in accordance with the present invention as it would appear prior to original mailing.

Referring to the drawings in greater detail, and referring first to the form of the device illustrated in Figs. 1–8 inclusive, a return envelope mailing piece, indicated generally at 20, includes a first envelope panel 21 which is flanked on one side by a second envelope panel 22 and on the opposite side by a protective panel 23, said panels being connected by hinge lines 24 and 25. As seen in Fig. 1, the first envelope panel 21 is provided along the side margins of its inner face with strips of cohesive but inadhesive material 26a and 27a; while the second envelope panel 22 is provided on its inner face along its side margins with identical strips of material 26b and 27b which match, respectively, with the strips 26a and 27a of the first envelope panel 21. Near the free edge of the second envelope panel 22 is a small area of moisture sensitive adhesive 28, while extending along the entire free edge of the protective panel 23 is a band of moisture sensitive adhesive 29.

Figure 2:
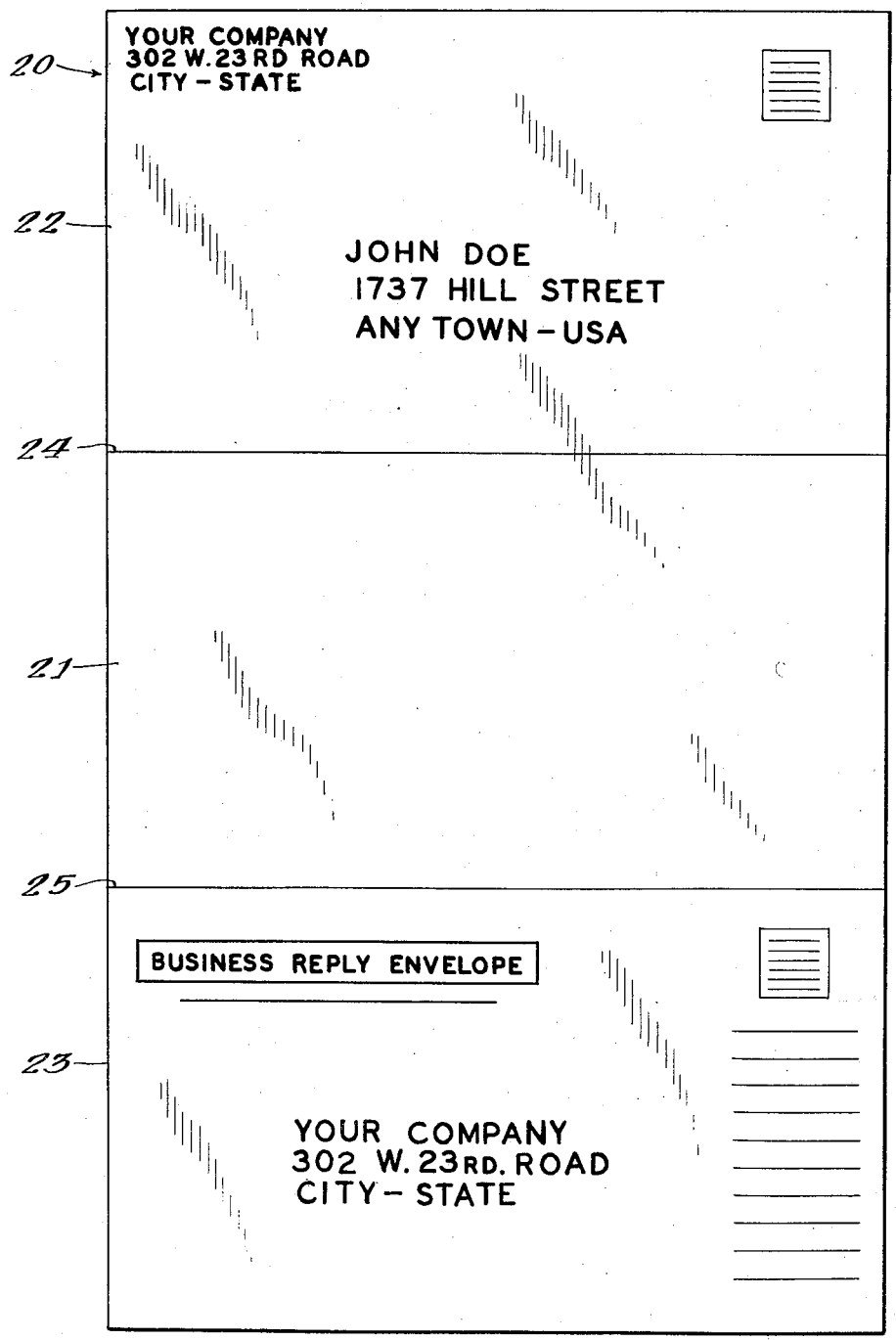
Fig. 2 is a plan view of the outer face of the sheet shown in Fig. 1.

It is seen in Fig. 1 that the inner face of sheet 20 may be provided with any desired copy, so that, for example, the protective flap might be furnished with material forming an order blank or subscription blank. As seen in Fig. 2, the second envelope panel 22 is provided on its back face with a return address of the company making the original mailing, and also with the address of the original addressee, which may be applied by any known means such as addressograph. The back face of the protective panel 23 is provided with a printed address for returning it to the original sender.

As seen in Figs. 3 and 4, when the sheet 20 is folded for the first mailing to the original addressee the protective panel 23 is folded between the two envelope panels 21 and 22 so as to segregate the strips of dry sealing adhesive 26a and 27a from the matching strips 26b and 27b. The small area of moisture sensitive adhesive 28 on the inner face of the second envelope flap 22 is adhered to the outer face of the protective panel 23 adjacent the line of the hinge 25. Obviously, as is common in this art, the small area of moisture sensitive adhesive 28 may be omitted and the mailing piece closed by means of a staple or a separate seal. When the mailing piece is opened by the original addressee, he is able to read the copy provided by the sender, and if he wishes to respond to the sender's offer he merely folds the envelope panels 21 and 22 along their hinge line 24 to bring the matching strips of dry sealing adhesive 26a and 26b and 27a and 27b into facing relationship, thus adhering the strips to one another and forming the envelope panels into an envelope. In this disposition of the panels, which is seen in Fig. 5, the protective panel 23 serves as an envelope flap; and as the copy on the envelope flap is still visible it may serve as an order blank or the like, and may be severed from the envelope panels when the mailing piece is received by the original sender. When the protective panel 23 is folded over the second envelope panel 22 it conceals the original address, and places the company return address on the outer face. The moisture sensitive adhesive strip 29 along the free edge of the protective panel may be moistened and adhered to the adjacent marginal portion of the envelope for the return mailing to the original sender.

The form of the invention illustrated in Figs. 9 to 13 is the same in its basic construction as the form shown in Figs. 1 to 8, and accordingly corresponding parts will be correspondingly numbered with the numbers 100 higher than in the first form of the invention.

Figure 9:
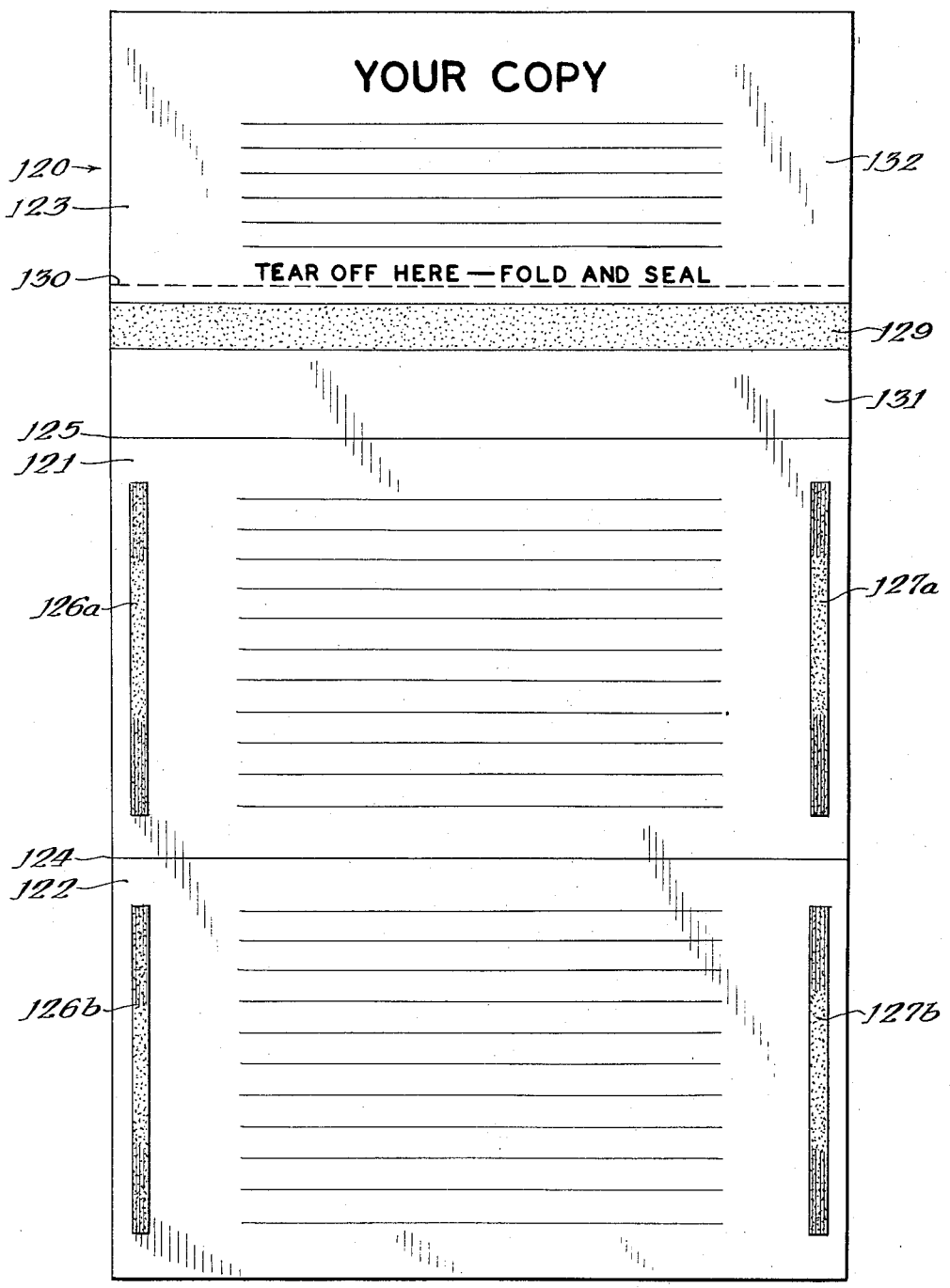
Fig. 9 is a plan view of the inner face of a second form of the device.

Thus, as seen in Fig. 9, a second form of the device comprises a mailing piece 120 which consists of first and second envelope panels 121 and 122 and a protective panel 123, all connected by hinge lines 124 and 125. Matching strips of dry sealing adhesive 126a and 126b and 127a and 127b extend along the side margins of the inner faces of the two envelope panels. This form of the invention is intended for initial mailing in a window envelope E which is shown in broken lines in Fig. 11 enclosing the mailing piece which is folded for initial mailing with the original address showing through the window W of the envelope. Accordingly, there need be no area of moisture sensitive adhesive upon the inner face of the second envelope panel 122.

Likewise, in this form of the invention the protective panel 123 is provided with a transversely extending line of weakening 130 which divides it into an envelope flap 131 and a detachable portion 132 which may serve as an order blank or the like. A strip of moisture sensitive adhesive 129 extends transversely across the envelope flap 131 immediately adjacent the line of weakening 130.

Figure 10:
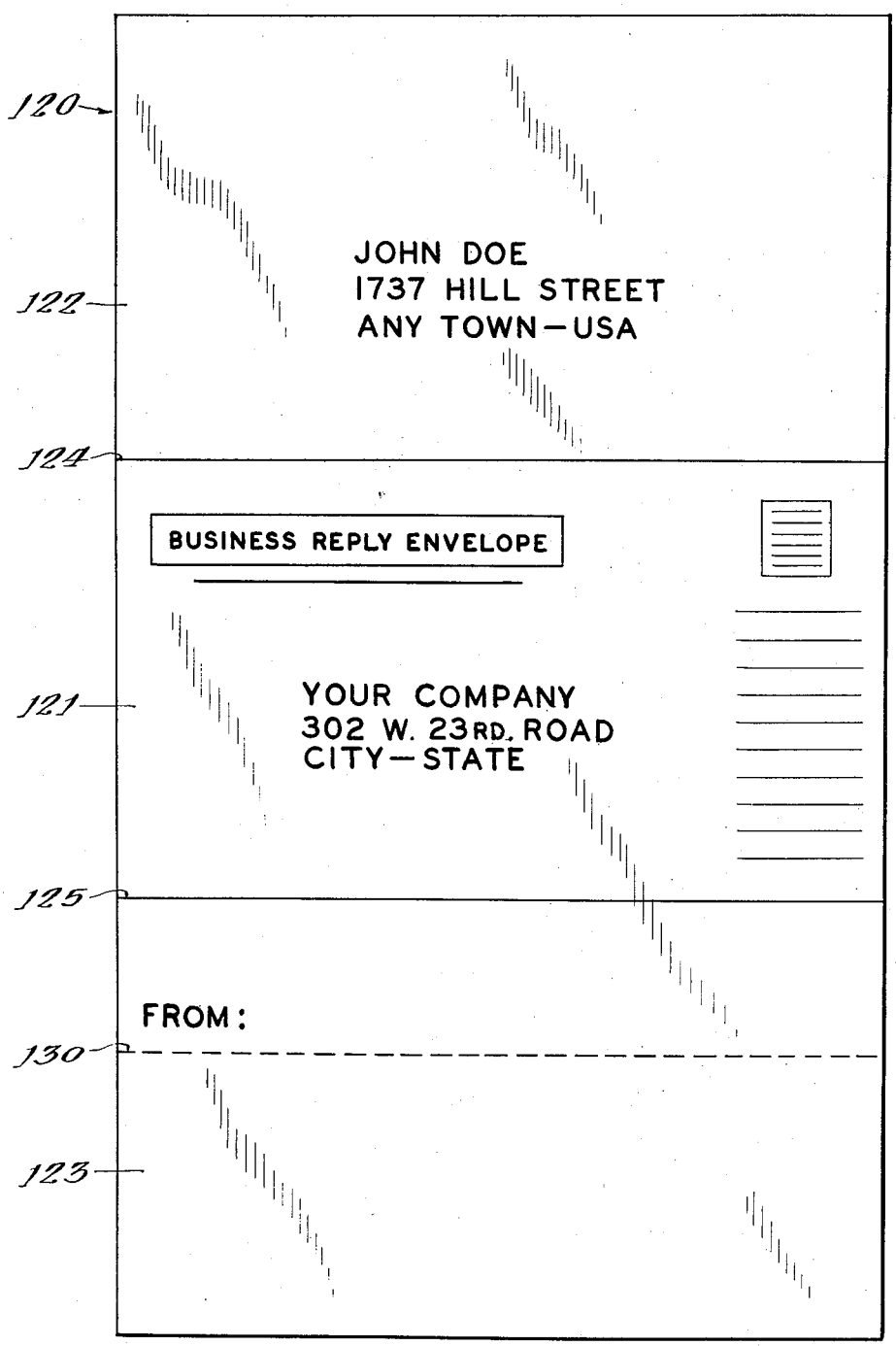
Fig. 10 is a plan view of the outer face of the second form of the device.
Figure 15:
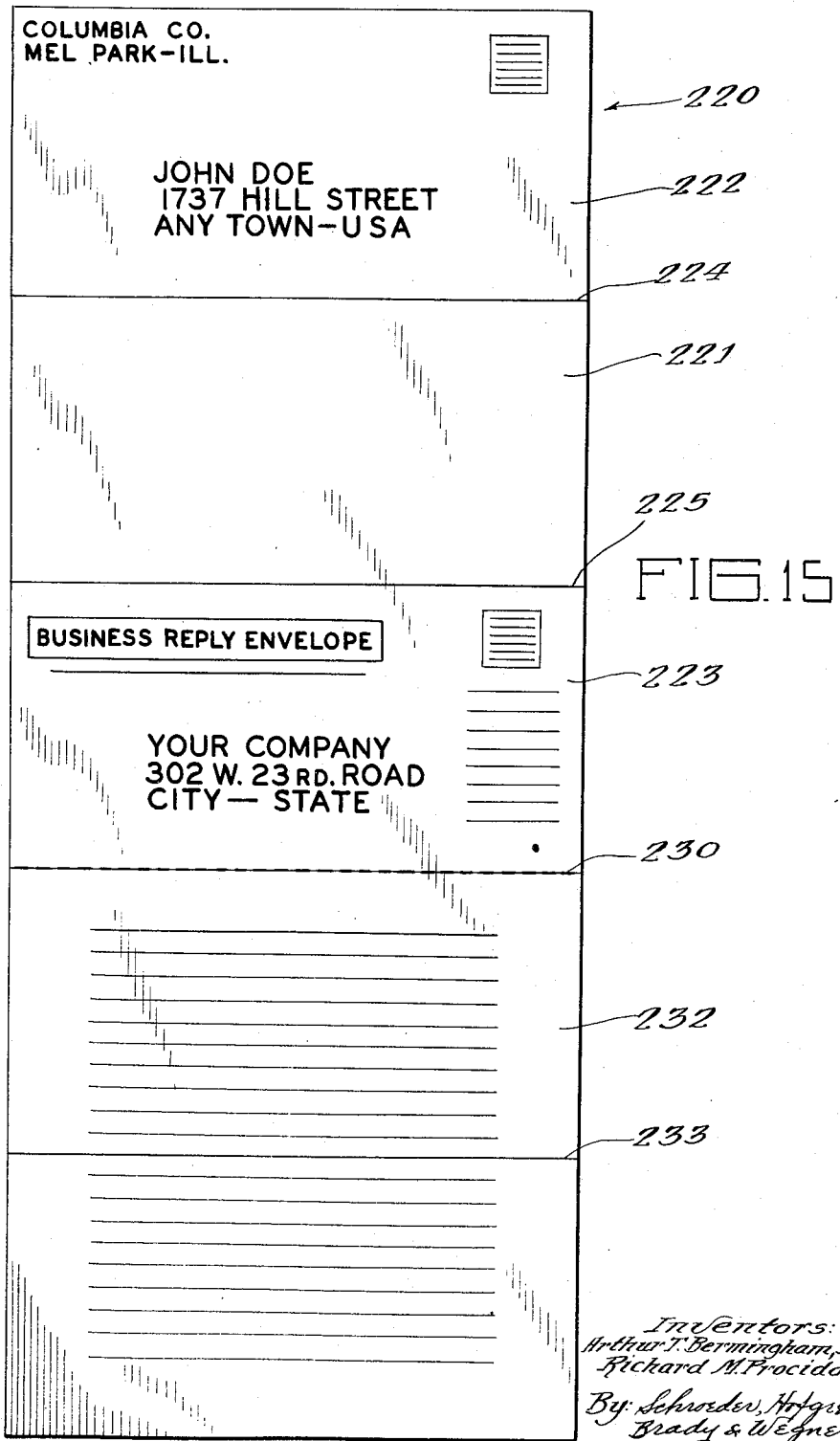
Fig. 15 is a plan view of the outer face of the device of Fig. 14.

As seen in Fig. 12, when the second form of the device is prepared for return mailing to the original sender, the detachable order blank portion 132 of the protective panel 123 is severed along the line of weakening 130, and may be folded and placed in the envelope formed by the envelope panels 121 and 122. The envelope flap 131 is folded over the second envelope panel 122, and the strip of moisture sensitive adhesive 129 is moistened and adhered to the outer face of said panel immediately above the name of the original addressee. As seen in Fig. 10, the envelope flap 131 is provided on its outer face with the word "From" which is brought into position adjacent the name and address of the original addressee when the envelope flap is adhered to the outer face of the second envelope panel 122, so that this serves as a return address to the original addressee, while the business reply address is on the opposite face of the return envelope for return mailing as in the first form of the invention.

The third form of the device illustrated in Figs. 14 to 19 consists of a single sheet mailing piece indicated generally at 220 which contains the same basic components as the first two forms of the invention. Thus, it has first and second envelope panels 221 and 222, and an elongated protective panel indicated generally at 223, which are connected by hinge lines 224 and 225. Matching strips of dry sealing adhesive 226a and 226b and 227a and 227b are provided on the inner faces of the two envelope panels 221 and 222, as in the first two forms of the invention; and as in the first form the inner face of the second envelope panel 222 has a small area of moisture sensitive adhesive 228.

In this form of the invention the protective panel 223 is provided with a transverse line of weakening 230 which divides it into an envelope flap 231 and a detachable order blank portion 232. The detachable portion 232 is approximately twice the length of the envelope flap portion 231 and is divided by a fold line or hinge line 233 into two parts which may be folded together and then folded over the envelope flap 231 when the mailing piece is being prepared for original mailing. The three-segmented protective panel 223 is then folded between the two envelope panels 221 and 222 for mailing to the original addressee, and the small area 228 of moisture sensitive adhesive is used to seal the mailing piece for this first mailing.

As seen in Fig. 17, all three portions of the protective panel 223 lie between the envelope panels 221 and 222 so as to segregate the strips of dry sealing adhesive from one another.

As seen in Fig. 18, when this form of the device is prepared for return mailing the detachable portion 232 is severed from an envelope flap 231 along the line of weakening 230, so that the severed portion 232 may be placed in the envelope and returned to the sender in the form of an order blank. The envelope panels 221 and 222 having been adhered to one another to form an envelope by abutting the matching cohesive strips of dry sealing adhesive, the order blank is placed in the envelope which is then sealed by moistening a strip of moisture sensitive adhesive 229 on the envelope flap 231 and adhering it to the adjacent envelope panel 222. As in the first form of the device, this completely conceals the original address, and the only visible address on the envelope for return mailing is the address of the original addressee on the outer face of the first envelope panel 221.

It will be observed that in each form of the invention the protective panel is either the same length as each of the two envelope panels, or else it is adapted to be folded so as to be the same length as each of the two envelope panels, so that when the protective panel is positioned between the envelope panels it completely segregates the strips of dry sealing adhesive on said panels from one another. In the first and third forms of the invention the envelope flap is also the same width as the envelope panels so as to completely conceal the original address when the mailing piece is formed into an envelope and sealed for mailing; while in the second form of the device the envelope flap is too short to cover the name and address of the original addressee, but is provided with the word "From" which is positioned immediately above the original addressee's name to serve as a return to sender address.

It is obvious from the foregoing description of the various forms of the device that any of the forms may very easily be manufactured and printed in a continuous operation performed on a paper web drawn from a supply roll, the continuous printed web, provided with the necessary strips of dry sealing adhesive and moisture sensitive adhesive, being cut into single mailing piece lengths and automatically stacked for shipping.

The foregoing detailed description is given for clearness of understanding only, and no unnecessary limitations should be understood therefrom, as some modifications will be obvious to those skilled in the art.

We claim:

A return mailing piece comprising: an imperforate rectangular sheet, a pair of fold-lines on said sheet which divide the sheet into two end panels and an intermediate panel all of substantially the same size, one of said end panels providing an initial mailing address space and the other of said end panels providing a space for a return address; matching longitudinally extending strips of dry-sealing material secured along the side margins of the inner faces of said second end panel and said intermediate panel so that engagement of said matching strips is adapted to form said panels into an envelope having an open inner margin; said first end panel being adapted to be folded to a first mailing position between the inner faces of said other panels to segregate the matching strips of dry sealing adhesive from one another, and also to be folded to a second mailing position overlying at least part of the outer face of said second end panel to provide an envelope flap when said second end panel and said intermediate panel are secured together by said strips, and a generally transversely extending strip of moisture sensitive adhesive on the inner face of said first end panel for adhering said panel to the outer face of said second end panel.

References Cited in the file of this patent

UNITED STATES PATENTS

| | | |
|---|---|---|
| 1,479,280 | Brown | Jan. 1, 1924 |
| 2,168,920 | Wissmann | Aug. 8, 1939 |
| 2,686,005 | Hyman | Aug. 10, 1954 |
| 2,759,658 | Sawdon | Aug. 21, 1956 |
| 2,773,638 | Krohn | Dec. 11, 1956 |

FOREIGN PATENTS

| | | |
|---|---|---|
| 405,553 | France | Nov. 18, 1919 |